(12) United States Patent
Tian et al.

(10) Patent No.: US 10,133,081 B2
(45) Date of Patent: Nov. 20, 2018

(54) BEAM SPLITTER, LASER GENERATOR AND EXCIMER LASER ANNEALING APPARATUS

(71) Applicant: BOE TECHNOLOGY GROUP CO., LTD., Beijing (CN)

(72) Inventors: Xiangjun Tian, Beijing (CN); Yan Chen, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 40 days.

(21) Appl. No.: 15/308,091

(22) PCT Filed: Jan. 15, 2016

(86) PCT No.: PCT/CN2016/071037
§ 371 (c)(1),
(2) Date: Oct. 31, 2016

(87) PCT Pub. No.: WO2017/028489
PCT Pub. Date: Feb. 23, 2017

(65) Prior Publication Data
US 2017/0184866 A1  Jun. 29, 2017

(30) Foreign Application Priority Data

Aug. 20, 2015 (CN) .......................... 2015 1 0514826

(51) Int. Cl.
*G02B 27/10* (2006.01)
*G02B 27/14* (2006.01)
(Continued)

(52) U.S. Cl.
CPC .......... *G02B 27/144* (2013.01); *H01S 3/0071* (2013.01); *H01S 3/225* (2013.01)

(58) Field of Classification Search
CPC ...... G02B 27/144; H01S 3/0071; H01S 3/225
See application file for complete search history.

(56) References Cited

U.S. PATENT DOCUMENTS 5,450,240 A  9/1995 Hall, II et al.

FOREIGN PATENT DOCUMENTS

CN  87106576 A  5/1988
CN  1546273 A  11/2004
(Continued)

OTHER PUBLICATIONS

Chinese Rejection Decision, for Chinese Patent Application No. 201510514826.4, dated Apr. 14, 2017, 15 pages.
(Continued)

*Primary Examiner* — Joseph P Martinez
(74) *Attorney, Agent, or Firm* — Kinney & Lange, P.A.

(57) ABSTRACT

Embodiments of the present invention provide a beam splitter, a laser generator and an excimer laser annealing apparatus, which relate to field of display technology, and reduce probability of pollution of the beam splitter to some extent and increase homogeneity of the laser beam that is passed through the beam splitter. The beam splitter includes a transmission region configured as a through-hole and a reflective region arranged at a periphery of the through-hole, wherein the through-hole is configured to be transmitted by a first laser beam that is received; and the reflective region is configured to reflect the first laser beam that is received. The beam splitter may be used in a laser generator to perform a scanning annealing process.

8 Claims, 4 Drawing Sheets

(51) Int. Cl.
      *H01S 3/225*     (2006.01)
      *H01S 3/00*      (2006.01)

(56) References Cited

FOREIGN PATENT DOCUMENTS

| | | | | |
|---|---|---|---|---|
| CN | 101051212 | A | 10/2007 | |
| CN | 101158821 | A | 4/2008 | |
| CN | 102095688 | A | 6/2011 | |
| CN | 102262074 | * | 11/2011 | ............ G01N 21/63 |
| CN | 102262074 | A | 11/2011 | |
| CN | 102486406 | A | 6/2012 | |
| CN | 103557847 | * | 2/2014 | ............ G01C 15/00 |
| CN | 103557847 | A | 2/2014 | |
| CN | 103557941 | A | 2/2014 | |
| CN | 203572488 | U | 4/2014 | |
| CN | 104330843 | A | 2/2015 | |
| CN | 104684457 | A | 6/2015 | |
| CN | 104766813 | A | 7/2015 | |
| CN | 105108330 | A | 12/2015 | |
| JP | 01155315 | A | 6/1989 | |
| WO | 2013009550 | A2 | 1/2013 | |

OTHER PUBLICATIONS

First Chinese Office Action, for Chinese Patent Application No. 201510514826.4, dated Jun. 27, 2016, 13 pages.
Written Opinion and International Search Report, for PCT Patent Application No. PCT/CN2016/071037, dated Apr. 26, 2016, 15 pages.
Second Chinese Office Action, for Chinese Patent Application No. 201510514826.4, dated Dec. 2, 2016, 13 pages.

* cited by examiner

BEAM SPLITTER, LASER GENERATOR AND EXCIMER LASER ANNEALING APPARATUS

BACKGROUND

1. Technical Field

The present invention relates to field of display technology, and particularly to a beam splitter, a laser generator and an excimer laser annealing apparatus.

2. Description of the Related Art

Currently, as shown in FIG. 1, a laser generator may specifically include a laser tube 01, a beam splitter 02, a reflective sheet 03 and an energy monitoring unit 04. Specifically, within the laser tube 01, a mixed gas consisted of xenon gas, neon gas, helium gas is discharged at a high voltage to generate photon, forming a laser beam. The laser beam is transmitted from the laser tube 01 to the beam splitter 02 and is converted into two laser beam after passing through the beam splitter 02.

Generally, as shown in FIG. 2, the beam splitter 02 is a high-transmission sheet, which has, for example, a transmission of 98% and a reflectivity of 2%. In this way, 98% of the laser beam transmits through the beam splitter 02 and then is formed as a linear optical source after undergoing a serious of optical transformations. The formed linear optical source can perform a scanning annealing on amorphous silicon. 2% of the laser beam is reflected to the reflective sheet 03 and finally arrives at the energy monitoring unit 04. The energy monitoring unit 04 can use the 2% of the laser beam as feedback parameter to generate a feedback control signal, so that operator may timely adjust the energy of the laser beam that is generated by the laser tube 01 according to the feedback control signal.

After usage for a period of time, the beam splitter 02 may be polluted and in turn the transmission of the beam splitter 02 is degraded, which causes energy of the transmitted laser beam to be reduced so that a difference between the energy of the transmitted laser beam and that of the laser beam generated by the laser tube 01 is formed. Further, due to the polluted beam splitter 02, the homogeneity of the transmitted laser beam is degraded.

SUMMARY

Embodiments of the present invention provide a beam splitter, a laser generator and an excimer laser annealing apparatus, which can reduce probability of pollution of the beam splitter to some extent and increase homogeneity of the laser beam that is passed through the beam splitter.

In an aspect, embodiments of the present invention provide a beam splitter comprising a transmission region configured as a through-hole and a reflective region arranged at a periphery of the through-hole, and wherein, the through-hole is configured to be transmitted by a first laser beam that is received; and the reflective region is configured to reflect the first laser beam that is received.

In another aspect, embodiments of the present invention provide a laser generator comprising the beam splitter as described in any of the above.

In another aspect, embodiments of the present invention provide an excimer laser annealing apparatus comprising the laser generator as described in any of the above.

BRIEF DESCRIPTION OF THE DRAWINGS

In order to more clearly indicate the technical schemes in embodiments of the present invention or in prior art, the drawings that are used to illustrate the embodiments or the prior art will be described simply hereafter. Obviously, the drawings in the followings belong to merely some embodiments of the present invention. However, it is obvious for those skilled in the art to obtain other drawings based on the disclosed drawings without involving inventive labor.

DETAILED DESCRIPTION OF THE EMBODIMENTS

In the following description, in order to illustrate rather than limit, there are provided specific details regarding, such as, system structure, interface and technology, etc., so that the present invention is completely understood. However, it is appreciated by those skilled in the art that the present invention can be achieved in other embodiments without these details. In other situation, the description about details of well-known device, electric circuit and approach is omitted for facilitating the description of the present invention without unnecessary details.

In addition, terms of "first", "second" are only used for description, and should not be understood to hint or suggest "priority" or to impliedly represent the number of the involved features. As such, the feature defined by wordings of "first", "second" may obviously or impliedly include one or more such feature(s). In the description of the present invention, wordings of "a plurality of" mean two or more, unless otherwise specified.

Figure 1:
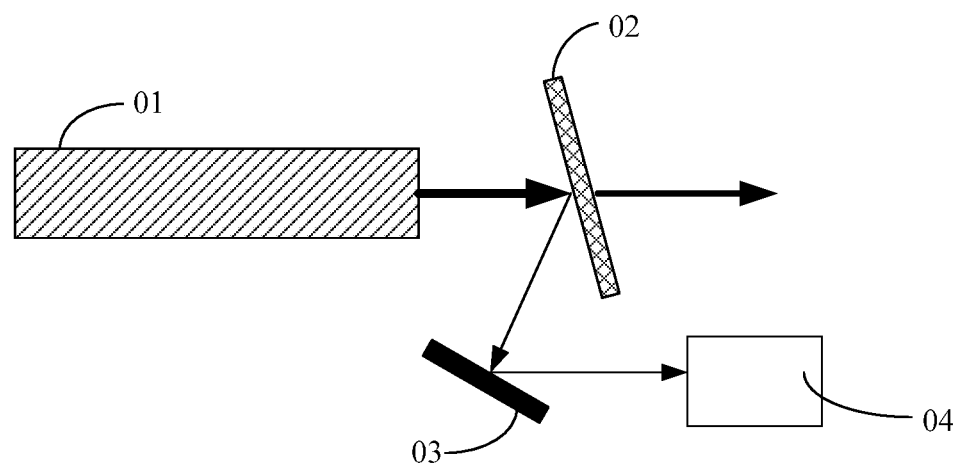
FIG. 1 is a schematic structural view of a laser generator in prior art.
Figure 2:
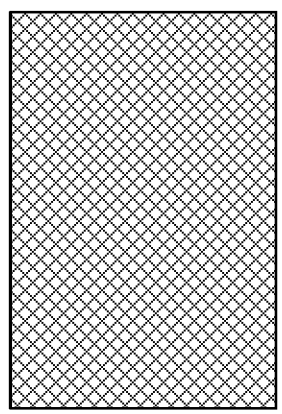
FIG. 2 is a schematic structural view of a beam splitter in prior art.
Figure 3:
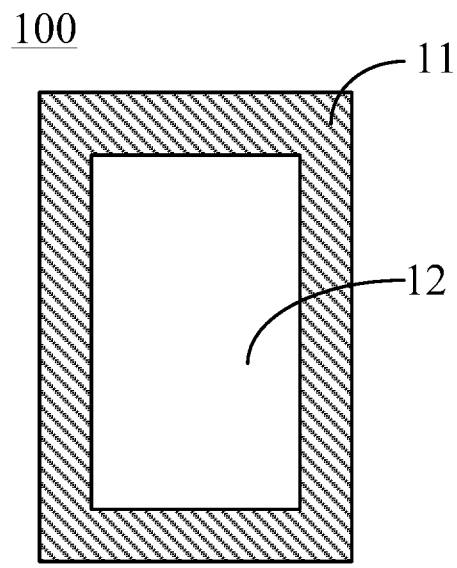
FIG. 3 is a first schematic structural view of a beam splitter according to an embodiment of the present invention.

Embodiments of the present invention provide a beam splitter 100. As shown in FIG. 3, a beam splitter 100 comprises a transmission region and a reflective region 11. Specifically, the transmission region is configured as a through-hole 12 and the reflective region 11 is arranged at a periphery of the through-hole 12.

Figure 4:
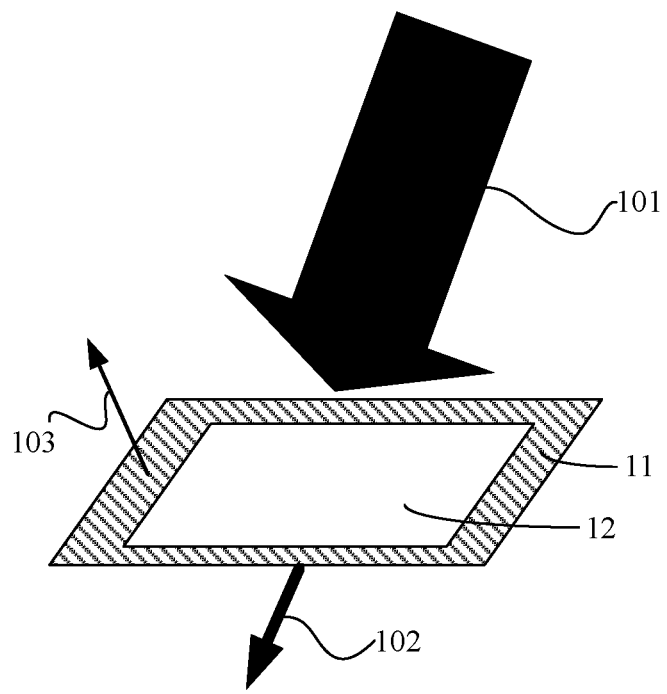
FIG. 4 is a first schematic principle view of a beam splitter according to an embodiment of the present invention.

Specifically, as shown in FIG. 4, the transmission region is configured to be transmitted by a first laser beam 101 that is received to form a second laser beam 102; the reflective region 11 is configured to reflect the first laser beam 101 that is received to form a third laser beam 103.

In this way, a portion of the first laser beam 101 transmits directly through the beam splitter 100 via the through-hole 12 of the beam splitter 100 to form the second laser beam 102, without passing through a high-transmission sheet like that in prior art, thereby avoiding attenuation of the energy of the laser beam caused by passing the laser beam through the high-transmission sheet and degradation of homogeneity of the second laser beam caused by passing the laser beam through the polluted high-transmission sheet. The second laser beam 102 that is transmitted through the beam splitter 100, after being performed a series of optical transformation, can be used as a linear light source to perform a scanning annealing process on amorphous silicon. Due to good homogeneity of the second laser beam 102, an improved effect of the scanning annealing process can be achieved.

meanwhile, since the reflective region 11 arranged at the periphery of the through-hole 12 can reflect a portion of the first laser beam 101 to form the third laser beam 103, it ensures the third laser beam 103 may be considered as a feedback variable of the laser generator subsequently to generate a feedback control signal such that operator may timely adjust the energy of the first laser beam 101 that is generated by the laser generator according to the feedback control signal.

Figure 5:
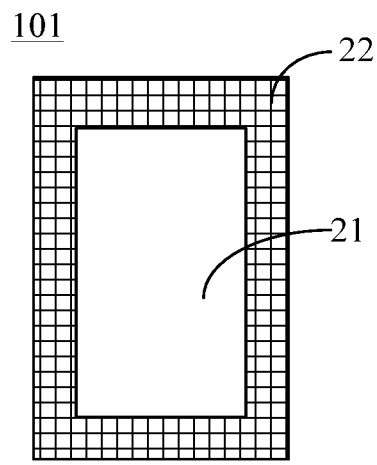
FIG. 5 is a schematic structural view for providing a first laser beam according to an embodiment of the present invention.

Specifically, as shown in FIG. 5, the first laser beam 101 generated by the laser tube within the laser generator includes a first region 21 where an energy of the first laser beam is centralized and a second region 22 where an energy of the first laser beam is diffused. Generally, the energy in central region of the first laser beam 101 is relatively centralized and the homogeneity is relatively good while energy in periphery region of the first laser beam 101 is gradually diffused.

Figure 6:
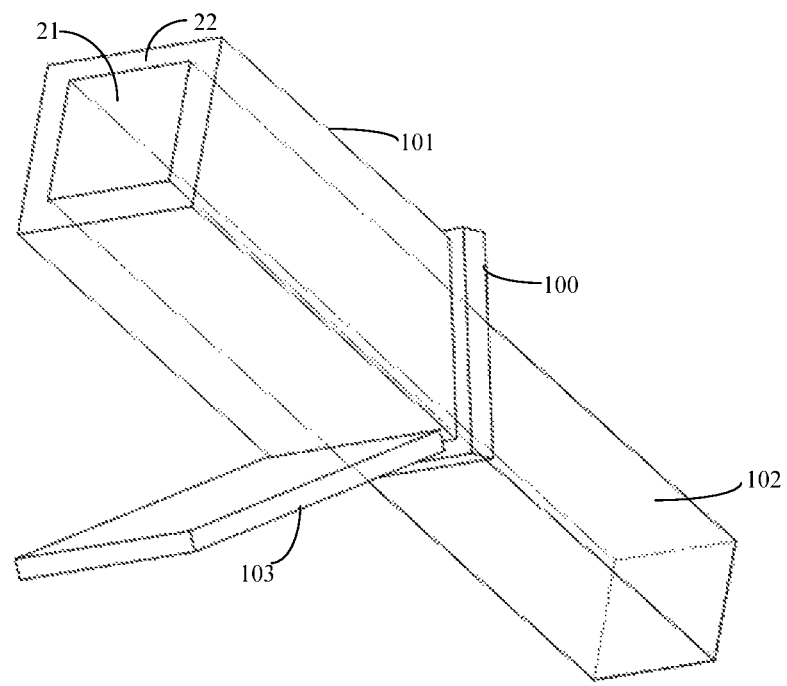
FIG. 6 is a second schematic principle view of a beam splitter according to an embodiment of the present invention.

Thus, in order to improve homogeneity of the second laser beam 102, as shown in FIG. 6, a projection of the through-hole 12 along a transmission direction of the first laser beam 101 is located within a projection of the first region 21 along a transmission direction of the first laser beam 101. In this way, the homogeneity of the second laser beam 102 that is transmitted through the through-hole 12 is relatively better.

Further, in order to obtain the second laser beam 102 with a good homogeneity to a maximum extent, still as shown in FIG. 6, the projection of the through-hole 12 along the transmission direction of the first laser beam 101 is fully overlapped with the projection of the first region 21 along the transmission direction of the first laser beam 101.

Further, the first laser beam 101 generated by the laser tube within the laser generator has a rectangle cross section. For example, the first laser beam 101 has a cross section in a size of 12 mm×36 mm. Thus, the through-hole 12 may be configured to have a rectangle cross section. Further, the projection of the through-hole 12 having a rectangle cross section along the transmission direction of the first laser beam 101 is fully overlapped with the projection of the first region 21 along the transmission direction of the first laser beam 101.

With this configuration, the second laser beam 102 transmitted from the rectangle through-hole 12 is a portion of the first laser beam 101 of which energy is centralized and maximized. Thus, the second laser beam 102 that is transmitted is in good homogeneity and has high energy.

Further, since the first laser beam 101 may directly transmit through the rectangle through-hole 12 without passing through the high-transmission sheet that may be polluted, the obtained second laser beam 102 is not affected, thereby avoiding increment in amount of attenuation and degradation of the homogeneity of the second laser beam 102 resulting from passing the laser beam through the high-transmission sheet and the like.

In addition, the reflective region 11 provided at the periphery of the through-hole 12 may be specifically a high-reflectivity mirror.

In an embodiment, specifically, the high-reflectivity mirror may include a reflective substrate and a reflective film that is coated on the reflective substrate. The reflective film can increase reflectivity of the high-reflectivity mirror and thus reduce amount of attenuation when forming the third laser beam 103.

Further, embodiments of the present invention provide a laser generator 200 comprising the above mentioned beam splitter 100.

Figure 7:
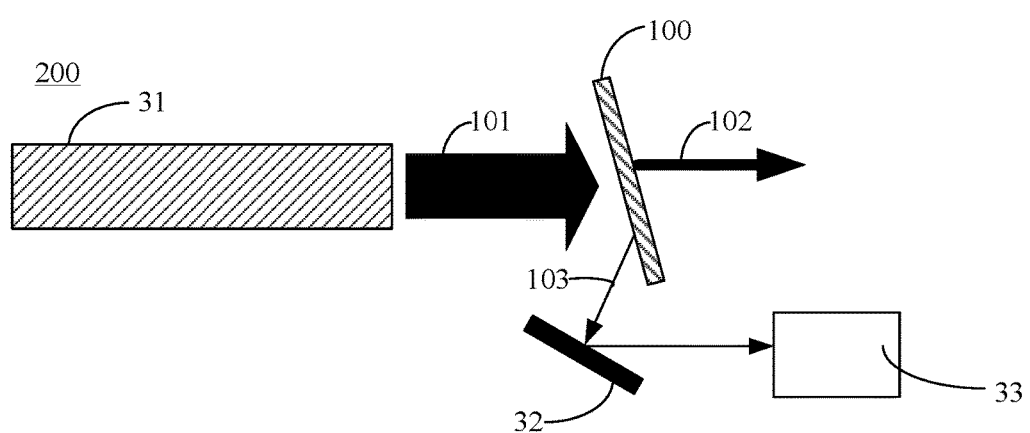
FIG. 7 is a structural schematic view of a laser generator according to an embodiment of the present invention.

As an example, as shown in FIG. 7, the laser generator 200 may specifically include a laser tube 31, a beam splitter 100, a reflective sheet 32 and an energy monitoring unit 33.

In the embodiment, the laser tube 31 is configured to generate a first laser beam 101 and the first laser beam 101 is transmitted to the beam splitter 100. Specifically, within the laser tube 31, a mixed gas consisted of xenon gas, neon gas, helium gas is discharged at a high voltage to generate photon, forming a first laser beam 101. The first laser beam 101 is transmitted from the laser tube 31 to the beam splitter 100.

The beam splitter 100 is configured to receive the first laser beam 101 generated by the laser tube 31, and, by referring a structural schematic view of the beam splitter 100 as shown in FIG. 3, a portion of the first laser beam 101 that is passed through the through-hole 12 of the beam splitter 100 is transmitted to form the second laser beam 102 and a portion of the first laser beam 101 is reflected by the reflective region 11 of the beam splitter 100 to form the third laser beam 103.

The reflective sheet 32 is configured to change a transmission direction of the portion of the third laser beam 103 that is formed by the beam splitter 100 such that the third laser beam 103 is transmitted to the energy monitoring unit 33. The number of the reflective sheet 32 may be greater than one.

The energy monitoring unit 33 is configured to detect an energy of the third laser beam 103 and to generate a feedback control signal according to the energy of the third laser beam such that operator can timely adjust the energy of the first laser beam generated in the laser tube 31 according to the feedback control signal.

Specifically, useful advantages of the beam splitter 100 according to embodiments of the present invention are described as below by referring to the beam splitter 100 according to embodiments of the present invention and replacement of the beam splitter 100 by a high-transmission sheet.

It is assumed that the energy of the first laser beam 101 formed by the laser tube 31 is W1, the energy of the second laser beam 102 formed by the portion of the first laser beam 101 that is passed through the beam splitter 100 is W2 and the energy of the third laser beam 103 formed by the portion of the first laser beam 101 is W3.

Then, W2=W1×a transmission of the beam splitter 100;
W3=W1×a reflectivity of the beam splitter 100.

wherein, if the transmission of the high-transmission sheet is 98%, its reflectivity is 2%. In this situation, after the laser generator is used for a period of time, the high-transmission sheet will be polluted, resulting in decrements of the transmission and the reflectivity of the high-transmission sheet, that is, resulting in decrements of W2 and W3. As the energy monitoring unit 33 can monitor the energy W3 of the third laser beam 103 and generate the feedback control signal, the operator can perform an adjustment of the laser generator when W3 which is monitored by the energy monitoring unit 33 is decreased, so as to increase the energy W2 of the second laser beam 102 to as the same level as it is before being polluted, thereby ensuring the second laser beam 102 to output a stable energy in subsequent processes.

From the above formula, it is needed to increase the energy W1 of the first laser beam 101 formed by the laser tube 31 so that the energy W2 of the second laser beam 102 will be increased to be equal to the energy value of the second laser beam 102 before being polluted. As a result, the energy W1 of the first laser beam 101 will become greater.

As a result, not only the energy difference between the inside and the outside of the high-transmission sheet becomes greater so that the high-transmission sheet will be blown out because of absorbing too much energy, but also the homogeneity of the second laser beam 102 formed by the portion of the first laser beam that is passed through the high-transmission sheet will become worse and worse with the increasing pollution of the high-transmission sheet, which will seriously affect quality of the subsequent processes.

By comparison, in the laser generator 200 according to embodiments of the present invention, the beam splitter 100 is composed of the through-hole 12 and the reflective region 11 arranged at the periphery of the through-hole 12. When the first laser beam 101 formed by the laser tube 31 is irradiated to the through-hole 12, a portion of the first laser beam 101 in a size equal to the through-hole 12 may be transmitted directly by the through-hole 12 to form the second laser beam 102. In the above process, since the energy W2 of the second laser beam 102 will not change as a result from pollution of the beam splitter 100, probability of change of energy difference between the energy W2 of the second laser beam 102 and the energy W1 of the first laser beam 101 may be reduced. Meanwhile, the homogeneity of the second laser beam 102 will not degrade as a result from pollution of the beam splitter 100.

Alternatively, as a cross section of the first laser beam 101 generated in the laser tube 31 of the laser generator 200 is generally rectangle and the first laser beam 101 includes the first region 21 where energy of the first laser beam is centralized and the second region 22 where energy of the first laser beam is diffused, energy of the portion in the center location of the first laser beam 101 is centralized and homogeneity of the portion is relatively better while the portion in peripheral location of the first laser beam 101 is diffused gradually.

Thus, in order to further increase homogeneity of the second laser beam 102, the through-hole 12 may be configured to have a rectangle cross section and the projection of the through-hole 12 along the transmission direction of the first laser beam 101 is fully overlapped with the projection of the first region 21 along the transmission direction of the first laser beam 101.

As an example, when adjustment or calibration is performed in practice, a recipe is needed to be set. The recipe may be set as $W_{set}$. In this situation, when the energy W2 of the second laser beam 102 decreases over time to a certain value, the operator input the energy W2 of the second laser beam 102 to a calibration window as the energy W1' (i.e., energy displayed within the tube) of the first laser beam 101 that does not pass through the beam splitter 100 and is calibrated. After calibration, a ratio of the energy displayed within the tube to the energy of the third laser beam 103 is n=W1'/W3. In this situation, the recipe $W_{set}$ is $W_{set}$=W1'=n*W3 and W3=W1×the reflectivity of the beam splitter 100. As the value of n is not changed for a while after calibration, adjustment of the recipe $W_{set}$ naturally results in change of W3, and in turn, the change of W3 necessarily results in a change of the energy W1 of the first laser beam 101 generated by the laser tube 31.

By comparison, in the beam splitter 100 provided by embodiments of the present invention, as the energy W2 of the second laser beam 102 that is passed through the through-hole will not change as a result from pollution of the beam splitter 100, the energy W2 of the second laser beam 102 is relatively stable and probability of change of energy difference between the energy W2 of the second laser beam 102 and the energy W1 of the first laser beam 101 may be reduced. In turn, the time of calibration performed by the operator according to the energy W3 of the third laser beam 103 as the feedback control signal may be reduced while avoiding pollution and obtaining the second laser beam with a relative homogenous energy.

Further, embodiments of the present invention provide an excimer laser annealing apparatus (ELA) comprising the above laser generator 200.

Specifically, by referring to FIG. 7, the laser generator 200 of the excimer laser annealing apparatus generates the second laser beam 102, and the second laser beam 102 may be used as a linear light source after being performed a series of subsequent optical transformations. For example, it is used to perform a scanning annealing process on amorphous silicon. As the laser beam may directly pass through the through-hole 12 of the beam splitter 100, instead of passing through a high-transmission sheet like that in prior art, to form the second laser beam 102, the second laser beam 102 obtained has a good homogeneity and is favor of annealing effect of the subsequent scanning annealing process.

Embodiments of the present invention provide a beam splitter, a laser generator and an excimer laser annealing apparatus. The beam splitter includes the transmission region and the reflective region. Specifically, the transmission region is the through-hole and the reflective region is arranged at a periphery of the through-hole, wherein the through-hole is configured to be transmitted by the first laser beam that is received; and the reflective region is configured to reflect the first laser beam that is received. As a result, a portion of the first laser beam that is passed through the through-hole of the beam splitter can directly transmit through the beam splitter, instead of passing through a high-transmission sheet like that in prior art, to form the second laser beam, thereby avoiding attenuation of the energy of the laser beam caused by passing the laser beam through the high-transmission sheet and degradation of homogeneity of the second laser beam caused by passing the second laser beam through the polluted high-transmission sheet, which reduces probability of pollution of the beam splitter to the extent and increases homogeneity of the laser beam that passes through the beam splitter.

In the above description of the present invention, specific features, structure, material or characteristic may be combined in a suitable manner in any one of one or more embodiments or examples.

The above description only relates to embodiments of the present invention, instead of limitation of protective scope of the present invention. It would be appreciated by those skilled in the art that all of changes and modifications based on the disclosure should be included within the scope of the present invention. The protective scope of the present invention shall be determined by the claims.

What is claimed is:

1. A beam splitter comprising a transmission region configured as a through-hole and a reflective region arranged at a periphery of the through-hole, wherein,
   the through-hole is configured to be transmitted by a first laser beam that is received;
   the reflective region is configured to reflect the first laser beam that is received;
   the first laser beam comprises a first region where an energy of the first laser beam is centralized and a second region where an energy of the first laser beam is diffused; and a projection of the through-hole along a transmission direction of the first laser beam is located within a projection of the first region along a transmission direction of the first laser beam.

2. The beam splitter as claimed by claim 1, wherein the projection of the through-hole along the transmission direction of the first laser beam is fully overlapped with the projection of the first region along the transmission direction of the first laser beam.

3. The beam splitter as claimed by claim 1, wherein a cross section of the through-hole with respect to a transmission direction of the first laser beam is in a rectangle shape.

4. The beam splitter as claimed by claim 1, wherein the reflective region is provided with a high-reflection mirror.

5. The beam splitter as claimed by claim 4, wherein the high-reflection mirror includes a reflective substrate and a reflective film that is coated on the reflective substrate.

6. A laser generator comprising the beam splitter as claimed in claim 1.

7. The laser generator as claimed in claim 6, further comprising a laser tube, a reflective sheet and an energy monitoring unit, wherein, the laser tube is configured to generate a first laser beam that is to be emitted to the beam splitter;

the beam splitter is configured to receive the first laser beam such that the first laser beam is transmitted by the through-hole of the beam splitter to form a second laser beam and the first laser beam that is received is reflected by the reflective region of the beam splitter to form a third laser beam;

the reflective sheet is configured to change a direction in which the third laser beam is transmitted such that the third laser beam is transmitted to the energy monitoring unit; and the energy monitoring unit is configured to detect an energy of the third laser beam and generate a feedback control signal according to the energy of the third laser beam.

8. An excimer laser annealing apparatus comprising the laser generator as claimed in claim 6.

* * * * *